UNITED STATES PATENT OFFICE.

ADOLF RÖMER, OF STUTTGART, GERMANY, ASSIGNOR, BY MESNE ASSIGNMENTS, TO ADOLF KUTTROFF, OF NEW YORK, N. Y.

MANUFACTURE OF SUBSTANCES PRECIPITATING GLUE.

1,375,975.

Specification of Letters Patent.

Patented Apr. 26, 1921.

No Drawing. Application filed November 28, 1914, Serial No. 874,540. Renewed April 24, 1920. Serial No. 376,429.

*To all whom it may concern:*

Be it known that I, ADOLF RÖMER, a subject of the German Emperor, and resident of Stuttgart, Germany, have invented certain new and useful Improvements in the Manufacture of Substances Precipitating Glue, of which the following is a specification.

It has been found that, by heating for a long time α- or ϐ-naphthol with a quantity of concentrated sulfuric acid calculated for one molecule, or with a slight excess of sulfuric acid (to about 25%) to temperatures of over 100°, it is possible to obtain new products of condensation of acid character, soluble in water, such products substantially differing from the well-known 1- or 2-oxynaphthalene sulfonic-acids obtained by the action of larger quantities of sulfuric acid on naphthalene, by the fact that they have considerable properties of precipitating glue, which is not the case in such degree with the ordinary sulfonic-acids. The heating as above described may also with advantage be carried out in the presence of a condensing agent such as phosphorus oxychlorid. Thus the naphthol may be heated at a mild temperature with phosphorus oxychlorid and a small quantity of sulfuric acid added during the heating.

The use of α- and ϐ-naphthol as raw material for substances suitable for tanning, is combined with a considerable advantage, as the slight tanning properties which naphthols already possess, become more favorably pronounced in the products of condensation. The said products strongly precipitate glue, and partly can precipitate glue from its solutions in completely neutral solution and even in the presence of sodium carbonate, which has never been yet observed. Owing to these technically valuable properties, the new substances can be used for tanning even in neutral or very slightly acid liquor. Such properties have never been known or utilized in any of the synthetic tanning substances hitherto known.

*Example 1.*

21 parts by weight of α or ϐ-naphthol are stirred in 18 parts by weight of concentrated sulfuric acid. The composition produced is heated for 4 hours to about 120°. If during heating a sample dissolved in water no longer shows any increase in the precipitation of glue, the mixture of composition is dissolved in water, boiled and eventually filtered. The slight quantities of excess of sulfuric acid are made to combine with lime. The clear solution filtered off from the sulfate of calcium, is converted with carbonate of sodium into a salt of sodium and separated by filtering from the carbonate of lime precipitated. The acidified solution is distinguished by strongly tanning properties, and can be used direct for tanning. Both the α- and ϐ-naphthol form during the above-described heating, a dark mixture or composition which is easily soluble in water and can be precipitated again by concentrated hydrochloric acid.

The tanning is then carried out in the following manner:

The solution of the product of condensation from 5 kg. naphthol, manufactured in accordance with the example 1 and slightly acidified, is placed into 500 liters of water, and the hides or skins prepared in the usual manner are introduced into the solution in question. The liquor is gradually improved by the addition of concentrated solutions, until the desired degree of tanning has been reached.

For tanning in tuns, the liquor may be taken from the first with considerably greater strength. For instance, a solution of $2\frac{1}{2}\%$ is taken first, and the proportion of tanning material is increased by further additions of concentrated solutions to about 4%, and the tanning is completed at the latter concentration.

It has been further found that the well known sulfonic acids of the α- and ϐ-oxynaphthalene are also converted into such products of condensation which precipitate glue, when they are heated, alone or with an addition of suitable condensing substances, such as for instance sulfuric acid, phosphorus oxy-chlorid or the like. The heating may be preferably effected with the exclusion of air or in a vacuum, in order to avoid any oxidation.

*Example 2.*

22 parts by weight of 1-oxynaphthalene-4-sulfonic acid are mixed with 2–7 parts by weight of concentrated sulfuric acid and heated for several hours to 120°. If a sample taken as described above, shows that the glue precipitation no longer increases, the mass obtained is dissolved in water and treated as above.

The product differs from the raw material, in addition to the strong glue-precipitating property, by its considerably smaller fluorescence, and more particularly by the difference of the dyes which it forms by combining with diazo-compounds. The dyes obtained with the new product of condensation, become much more strongly red or blue, and behave in a completely different manner when treated with concentrated hydrochloric acid. For instance, the color of the well-known azo-dye obtained from diazo - benzol and 1 - oxynaphthalene - 4 - sulfonic-acid, turns much less to blue-red than that of the corresponding dye obtained from the new product of condensation.

*Example 3.*

25 parts by weight of 2-oxynaphthalene-6-sulfonic-acid are mixed with, say, 25 parts by weight of oxy-chlorid of phosphorus, slowly heated in a water bath and then kept from one to two hours in a boiling water bath. When a sample no longer shows any increase in the precipitation of glue, the mixture is introduced into water, and the product of condensation is either precipitated direct by means of sodium chlorid, or purified by means of lime and sodium salt. In many cases, the raw mixture dissolved in water can also be used for tanning. The product of condensation thus obtained, produces a strong precipitation of glue in alkaline, neutral or acid solutions. Any excess of oxychlorid of phosphorus can be removed by distillation before dissolving the mixture in water.

While in the preceding example equal parts by weight of oxychlorid of phosphorus and of an oxy-naphthalene-sulfonic-acid were caused to act on each other at the temperature of water bath, it has been found that products of condensation can be obtained, which are soluble with much greater difficulty, but have the same glue-precipitating property when the quantity of oxychlorid of phosphorus is increased and the temperature raised.

*Example 4.*

25 parts by weight of 2-oxynaphthalene-6-sulfonic-acid are mixed with 30 parts by weight of oxychlorid of phosphorus, slowly heated in the water bath and kept for an hour in the boiling water bath. The whole is then heated to 115–120°, until the smell of oxy-chlorid of phosphorus has disappeared. The mixture produced, which is difficultly soluble in water, is first washed with water and then dissolved in boiling water with addition of carbonate of sodium, until the neutral or slightly alkaline reaction is obtained. When cooled, as well as when acidified with acetic acid or weak hydrochloric acid, the product once dissolved, remains in solution, and can be utilized in that shape for tanning. Strong acids precipitate it again from the solution in the form of a white amorphous deposit.

The alkaline solution as well as the neutral and the acid solutions, produce strong precipitates with solution of glue.

What I claim as my invention and desire to secure by Letters Patent is:—

1. A process of making tanning substances which comprises heating a naphthol-sulfonic acid to effect the formation of a new product which is capable of strongly precipitating glue.

2. A process of making tanning substances which comprises heating a naphthol-sulfonic acid in the absence of air to effect the formation of a new product which is capable of strongly precipitating glue.

3. A process of making tanning substances which comprises heating a naphthol-sulfonic acid in a vacuum to effect the formation of a new product which is capable of strongly precipitating glue.

4. A process of making tanning substances which comprises heating a naphthol-sulfonic acid with a condensing agent to effect the formation of a new product which is capable of strongly precipitating glue.

5. A process of making tanning substances which comprises heating a naphthol-sulfonic acid in a vacuum with a condensing agent to effect the formation of a new product which is capable of strongly precipitating glue.

6. A process of making tanning substances which comprises heating a naphthol-sulfonic acid with a small quantity of sulfuric acid to effect the formation of a new product which is capable of strongly precipitating glue.

7. A process of making tanning substances which comprises heating in a vacuum a naphthol sulfonic acid with a small quantity of sulfuric acid to effect the formation of a new product which is capable of strongly precipitating glue.

8. A process of making tanning substances which comprises heating a naphthol sulfonic acid with a small quantity of sulfuric acid and with phosphorus oxychlorid to effect the formation of a new product which is capable of strongly precipitating glue.

9. A process of making tanning substances which comprises heating a naphthol with about one molecular proportion of concentrated sulfuric acid to effect the formation of a new product which is capable of strongly precipitating glue.

10. A process of making tanning substances which comprises heating a naphthol with about one molecular proportion of concentrated sulfuric acid and with phosphorus-oxychlorid to effect the formation of a new product which is capable of strongly precipitating glue.

11. A process of making tanning substances which comprises heating in a vacuum a naphthol with about one molecular equivalent of concentrated sulfuric acid to effect the formation of a new product which is capable of strongly precipitating glue.

12. A process of making tanning substances which comprises heating in a vacuum a naphthol with about one molecular equivalent of concentrated sulfuric acid and with phosphorus-oxychlorid to effect the formation of a new product which is capable of strongly precipitating glue.

13. As a new composition of matter a condensation product of a naphthol sulfonic acid which product has strong glue-precipitating properties and is obtainable by heating a sulfonated naphthol at about 120 degrees centigrade, the new product containing at least two naphthalene nuclei in its molecule.

In testimony whereof I have signed my name to this specification in the presence of two subscribing witnesses.

Dr. ADOLF RÖMER.

Witnesses:
 FREDA K. CRIBER,
 PAULINE MÜLLER.